B. R. SKINNER.
STATION INDICATOR OR ADVERTISER.
APPLICATION FILED AUG. 21, 1911.
1,027,082.
Patented May 21, 1912.
4 SHEETS—SHEET 2.
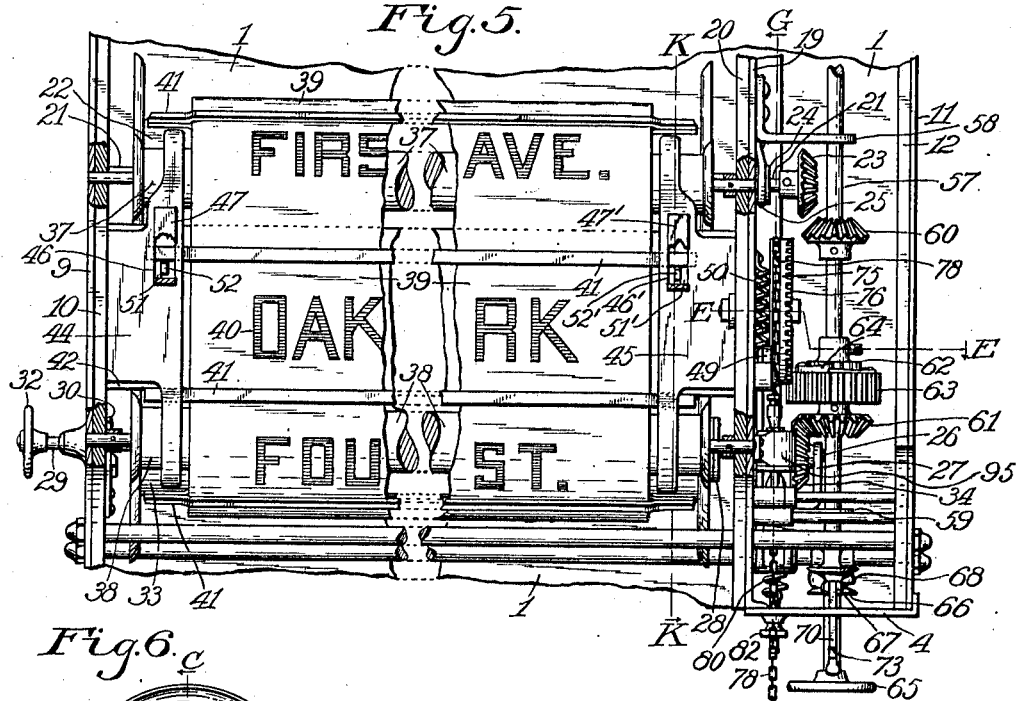
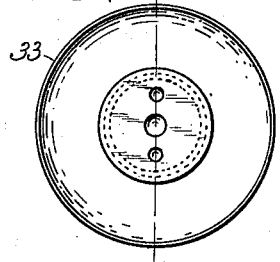
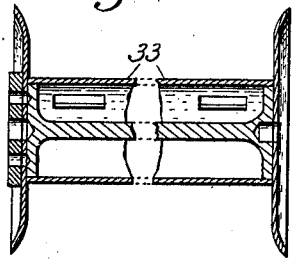
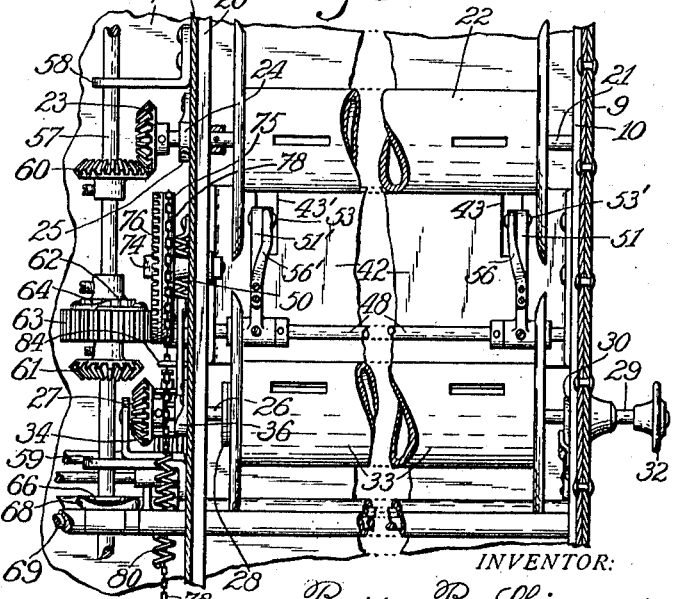
WITNESSES:
J. H. Gardner.
G. W. Poyner.
INVENTOR:
Burr R. Skinner,
BY
E. T. Silvius,
ATTORNEY.

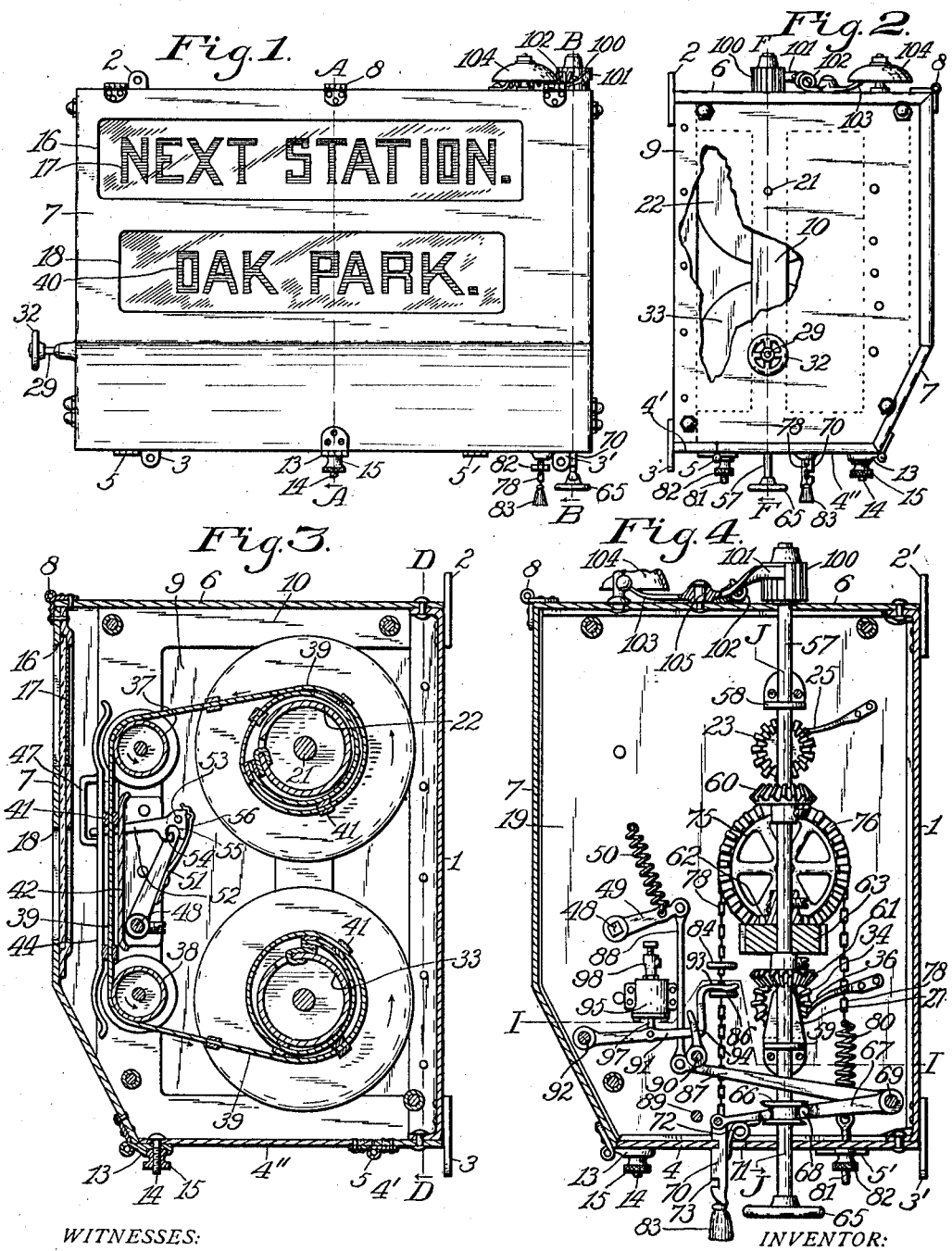

B. R. SKINNER.
STATION INDICATOR OR ADVERTISER.
APPLICATION FILED AUG. 21, 1911.
1,027,082.
Patented May 21, 1912.
4 SHEETS—SHEET 3.
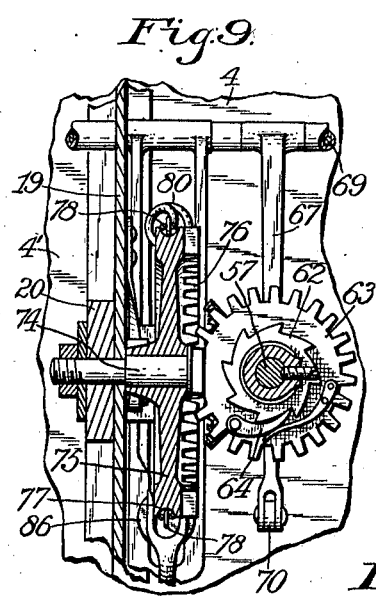
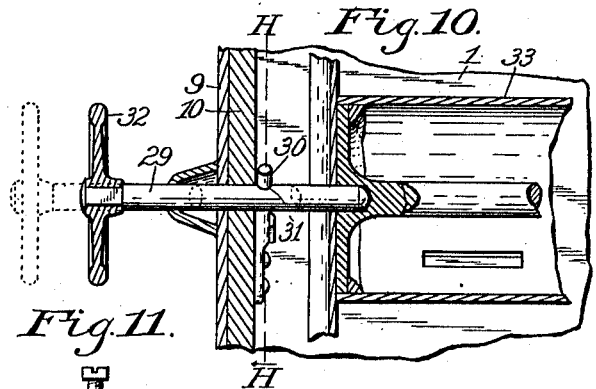
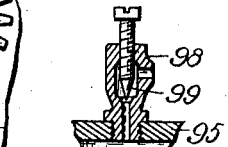
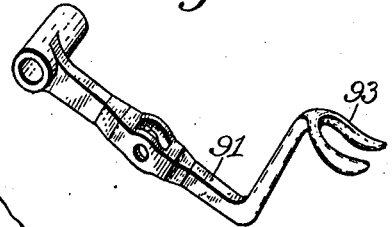
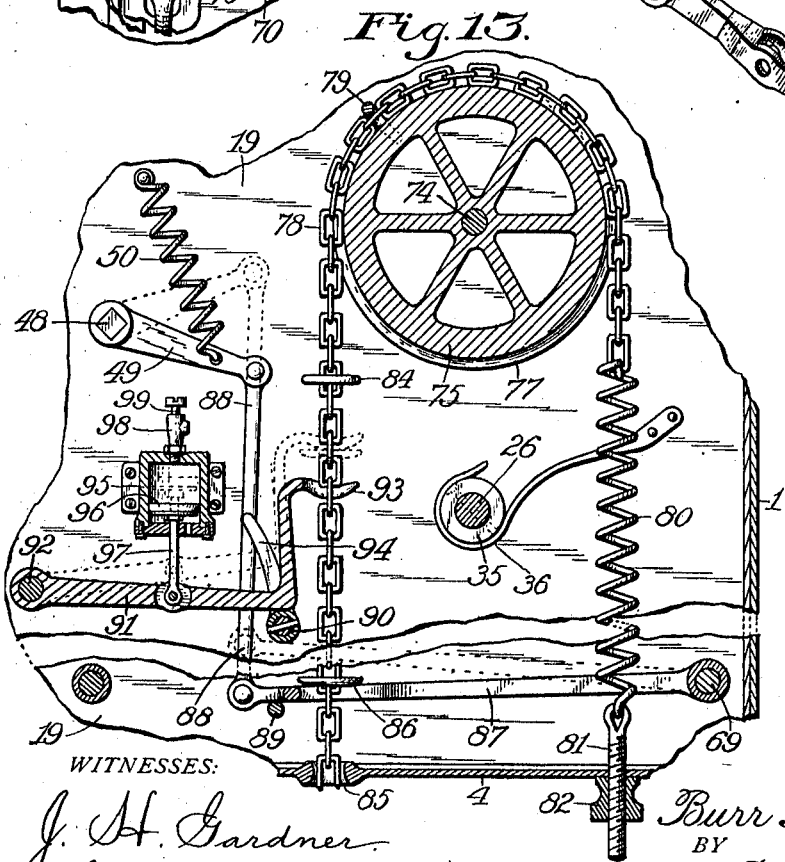
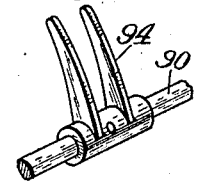
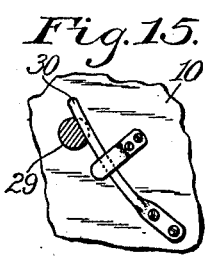
WITNESSES:
J. H. Gardner
G. W. Poyner
INVENTOR:
Burr R. Skinner,
BY
E. T. Silvius,
ATTORNEY.

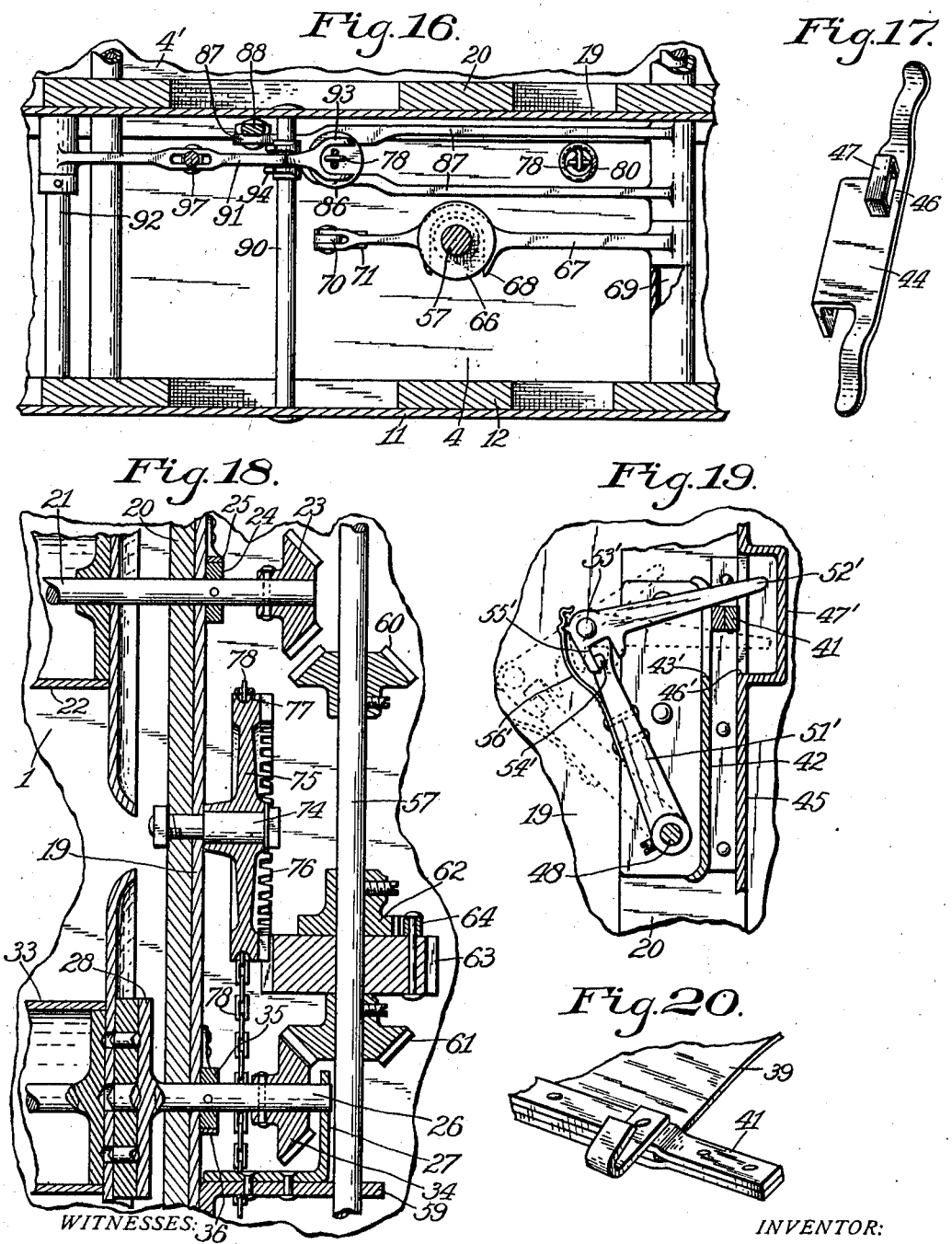

UNITED STATES PATENT OFFICE.

BURR R. SKINNER, OF ABERDEEN, SOUTH DAKOTA.

STATION-INDICATOR OR ADVERTISER.

1,027,082.   Specification of Letters Patent.   Patented May 21, 1912.

Application filed August 21, 1911. Serial No. 645,070.

*To all whom it may concern:*

Be it known that I, BURR R. SKINNER, a citizen of the United States, residing at Aberdeen, in the county of Brown and State of South Dakota, have invented a new and useful Station-Indicator or Advertiser, of which the following is a specification, reference being had to the accompanying drawings and to the letters and figures of reference marked thereon.

This invention relates to mechanical indicators or advertisers of the type that is adapted to be manually controlled, for indicating or announcing the names of stations or streets on lines of travel of cars or other passenger vehicles, or for advertising purposes, the invention having reference particularly to improvements in the apparatus for moving and controlling the name ribbons which carry the names of the stations or advertising matter.

The object of the present invention is to provide simple and cheap mechanism for operating the name ribbons and to stop them accurately in the proper relative positions without tearing or otherwise damaging the ribbons, a further object being to improve the construction generally in indicators or advertisers.

With the above mentioned and minor objects in view, the invention consists in an improved machine comprising a name ribbon mounted on rollers, and a spring actuated mechanism for operating the rollers to move the ribbon, the spring being adapted to be wound up or put under tension each time the ribbon is to be shifted, the mechanism including governing means for retarding the action of the spring when the ribbon is about to be stopped accurately in the proper position, so as to prevent fracture of the ribbon; and the invention consists further in the novel parts and combinations and arrangement of parts as hereinafter particularly described and pointed out in the appended claims.

Referring to the drawings, Figure 1 is a front elevation of the improved machine; Fig. 2, a side elevation partially broken away; Fig. 3, a vertical section on the line A A in Fig. 1; Fig. 4, a vertical section on the line B B in Fig. 1; Fig. 5, a fragmentary front elevation of the machine minus the front of the casing thereof; Fig. 6, an end elevation of one of the ribbon rollers; Fig. 7, a sectional view of the roller on the line C C in Fig. 6; Fig. 8, a fragmentary section on the plane of the line D D in Fig. 3; Fig. 9, a fragmentary horizontal section on the line E E in Fig. 5; Fig. 10, a fragmentary section on the line F F in Fig. 2; Fig. 11, a section of the air release valve used in connection with the motion retarding apparatus; Fig. 12, a perspective view of one of the parts of the motion retarding apparatus; Fig. 13, a fragmentary vertical section on the line G G in Fig. 5; Fig. 14, a perspective view of a guide for the parts shown in Fig. 12; Fig. 15, a fragmentary section on the line H H in Fig. 10; Fig. 16 a fragmentary horizontal section on the line I I in Fig. 4; Fig. 17, a perspective view of one of the guards of the ribbon stopping mechanism; Fig. 18, a fragmentary section on the line J J in Fig. 4; Fig. 19, a fragmentary section on the line K K in Fig. 5; and Fig. 20, a fragmentary perspective view of an end portion of the main ribbon and one of the stop bars thereof.

Similar reference characters throughout the different figures of the drawings indicate like elements or features of construction herein referred to.

The improved indicator or annunciator comprises a casing which is adapted to be constructed of suitable reinforced sheet metal, portions of the casing being adapted to constitute a frame for supporting the mechanism. The casing comprises a back 1 provided at its upper portion with supporting ears 2 and 2', and at its lower portion with similar ears 3 and 3'. The bottom of the casing comprises an end section 4 secured to the back, a relatively narrow rear portion 4' secured also to the back, and a drop door 4" connected to the narrow rear portion by means of hinges 5 and 5'. A top 6 is secured to the back, and a front door 7 is connected thereto by means of hinges 8, a side 9 provided with a reinforcement 10 being secured to the back 1 and the top 6 and also the bottom portion 4', a similar side 11 provided with reinforcement 12 being secured to the back and top and also to the bottom section 4. The door 7 is connected detachably to the drop door 4" preferably by means of a hasp 13, a bolt 14 and a thumb nut 15. The door 7 has a sight opening 16 in which a suitable stationary sign 17 is displayed. The door has also another sight opening 18 therein through which the station names or other matter may be seen. The casing has a partition 19 provided with reinforcement 20 secured therein at a suitable distance from the side 11 and it is secured to the bottom portion 4 and also to the back and top of the casing.

A shaft 21 is rotatably mounted in the side 9 and in the partition 19 and extends through the latter, and it has a roller 22 mounted fixedly thereon, the roller being arranged between said side and partition, and a bevel gear-wheel 23 is secured to the shaft beyond the partition. A brake wheel 24 is secured to the shaft adjacent the partition, and a spring shoe 25 is secured to the partition and partially embraces the brake wheel for preventing the roller from acquiring momentum when unrolling the name ribbon therefrom. A stub shaft 26 is rotatably mounted in the partition 19 and also in a suitably supported journal-box 27, the stub shaft extending through the partition in both directions and having a chucking head 28 thereon presented toward the side 9, a centering shaft 29 being mounted in the side 9 and provided with a spring latch 30 which is secured to said side and normally rests in a notch 31 in the side of the shaft, the outer end of the shaft being provided with a knob or handle 32 for turning the shaft and moving it endwise. A roller 33 is detachably connected to the chucking head 28 and is rotatably supported on the centering shaft 29. A bevel gear-wheel 34 is secured to the stub shaft 26. A brake wheel 35 is secured also to the stub shaft, and is embraced by a spring shoe 36 which is mounted on the partition 19 for slightly retarding the motion of the roller 33. Two guide rolls 37 and 38 are rotatably mounted in the side 9 and in the partition 19 adjacent the front 7, and a name ribbon 39 is suitably connected detachably to the two rollers 22 and 33 and extends over the guide rolls and between them and the front door 7, the ribbon having suitable station names 40 or other matter thereon adapted to be seen through the sight opening 18. In order to stop the ribbon accurately so that the station names shall be clearly seen at the sight opening the ribbon is provided with a suitable number of stop bars 41 which extend beyond the opposite edges of the ribbon. A guide plate 42 is secured to the side 9 and partition 19 and extends behind the ribbon between the two guide rolls 37 and 38, the plate having openings 43 and 43' therein. A guide plate 44 is secured to the side 9, and a somewhat similar guide plate 45 is secured to the partition 19, the guide plates 44 and 45 extending opposite the end portions of the plate 42 in a plane forward of the ribbon, said plates 44 and 45 having portions that extend at the fronts of the end portions of the guide rolls 37 and 38. The opposing guide plates are adapted to guide the stop bars 41 of the ribbon while the stop bars are in position for stopping the ribbon in the required position. The guide plates 44 and 45 have apertures 46 and 46' therein respectively that are covered by guards 47 and 47' respectively, the guards covering also the openings 43 and 43' in the plate 42. A rock shaft 48 is suitably mounted in the side 9 and partition 19, and it extends through the partition and has an arm 49 secured thereto to which a spring 50 is connected, the spring being connected to the partition 19 for retracting the arm. Two other arms 51 and 51' are secured to the rock shaft, and have fingers 52 and 52' connected thereto by means of pivots 53 and 53' respectively. The arms have stop projections 54 and 54' thereon respectively, which extend through openings 55 and 55' in the fingers for limiting the movement of the fingers on the pivots, the fingers extending through the openings in the plate 42 and in the guide plates 44 and 45 and are adapted to move a distance equal to the width of the stop bar on the name ribbon. Springs 56 and 56' are secured to the arms and engage the pivoted end portions of the fingers so as to yieldingly hold the fingers in the positions in which they may be adjusted on the pivots, the springs and the fingers being suitably adapted for the purpose.

A shaft 57 is arranged vertically in the casing opposite the ends of the shaft 21 and stub shaft 26, and it extends through the bottom portion 4 and preferably through the top 6 of the casing. The shaft is rotatably mounted in suitably supported journal-boxes 58 and 59 preferably mounted on the partition 19. A bevel wheel 60 is secured to the shaft adjacent to the wheel 23, and another bevel wheel 61 is secured to the shaft in reverse order adjacent to the wheel 34, the arrangement being such that either bevel wheel may be moved into engagement with the wheel that is adjacent to it. A ratchet-wheel 62 is secured also to the shaft 57, and a spur toothed wheel 63 is rotatably mounted on the shaft adjacent to the ratchet wheel, and has a pawl 64 mounted thereon that is spring pressed into engagement with the ratchet wheel. The lower end of the shaft 57 has a hand wheel 65 secured thereto below the casing so that when desired the shaft may be rotated by hand or may be moved endwise for shifting the wheels 60 and 61. Within the casing the shaft 57 has a grooved collar 66 thereon. An arm 67 is provided with fingers 68 which extend into the groove of the collar, and the arm is supported at one end on a shaft 69, the opposite end of the arm being provided with a latch bar 70, which extends through a slot 71 in the bottom portion 4 of the casing, the latch bar having notches 73 therein whereby the latch bar is adapted to engage the bottom portion 4, a suitable spring 72 being mounted on the arm 67 and normally holding the latch bar in engagement with the bottom portion so that the desired position of the shaft 57 may be maintained.

A stub shaft 74 is mounted on the partition 19 and rotatably supports a wheel or curved rack bar 75, which has crown teeth 76 thereon that are constantly in engagement with the teeth of the wheel 63 which is relatively broad faced, so as to permit the wheel 63 to be moved without becoming disengaged from the wheel 75. The periphery of the wheel 75 has a groove 77 therein, in which is a chain or cable 78 that is secured to the wheel by a suitable lug 79. One end of the chain is connected to a coil spring 80, which has a screw threaded rod 81 connected thereto, the rod extending through the bottom portion 4 of the casing and having an adjusting nut 82 thereon engaging the under side of said bottom portion. The spring is coiled somewhat closely so as to draw the chain toward the bottom of the casing. The chain extends over the uppermost portion of the wheel 75 and down through the bottom of the casing, and has a hand-hold 83 attached to its lower end below the casing, the portion 4 of the bottom having a suitable guideway 85 therein through which the chain may be smoothly guided. Preferably a guide eye 84 is mounted on the partition 19 and the chain extends through it. The chain has a button 86 secured thereto which is adapted to engage an apertured arm 87 that is connected at one end to the shaft 69, the latter being suitably supported in the casing, and a stiff link 88 is connected to the arm 87 and also to the arm 49 so that the spring 50 acts to retract the arm 87 after the button 86 is carried away from the arm. The arm 87 is limited in movement between two suitably supported rods 89 and 90.

An arm 91 is pivotally connected at one end to a suitably supported shaft 92, and it has a forked end 93 through which the chain 78 extends to be engaged by the button 86. Preferably a slotted guide 94 is secured to the shaft 90 and guides the arms 91 but may in some cases be dispensed with. An air cylinder 95 is secured to the partition 19, and it has a piston 96 therein provided with a rod 97 that is connected to the arm 91, the piston preferably having a cupped leather packing so that it may freely descend but is retarded by trapped air when ascending. The upper end of the cylinder is provided with a valve casing 98 in which a needle valve 99 is adjustably mounted for variably controlling the outlet of the trapped air.

A ratchet-wheel 100 is arranged similarly to the ratchet-wheel 62 and is secured to the shaft 57 preferably above the top 6 of the casing, the ratchet-wheel having a relatively broad face and is engaged by a pawl 101 suitably supported upon the casing and spring pressed into contact with the ratchet-wheel by means of a spring 102 connected to the pawl and also to the top 6, so as to prevent the pawl 64 when riding backward on the ratchet-wheel 62 from turning the shaft 57 backward. Preferably the pawl 101 has a bell clapper 103 thereon adapted to strike a gong 104 mounted upon the top 6 of the casing, the pawl preferably being connected to the top by means of a pivot 105. It should be understood that the hand-hold 83 is preferably formed of leather and has a tassel but may be otherwise constructed, or it may be omitted and the chain 78 operated otherwise than by hand, and various other modifications may fairly be made within the scope of the appended claims.

In practical use the chain is pulled down through the guideway 85 so as to turn the wheel 75 and the wheel 63 and put the spring 80 under tension, without turning the shaft 57 which is connected with either one of the rollers that move the name ribbon. When the chain is pulled until stopped the arm 87 is moved downward as is also the arm 49 so that the fingers 52 and 52' are withdrawn from contact with the stop bar 41 of the ribbon. The weight of the arm 91 moves the piston 96 downward after the button 86 is moved away from the end 93. The chain is then released and the spring 80 permitted to turn the wheel 75 in the opposite direction, so as to turn the wheel 63 that carries the pawl 64 which turns the ratchet wheel 62 and consequently rotates the shaft 57, the shaft causing the roller with which it may be connected to rotate, and the ratchet-wheel 100 causes repeated movements of the pawl 101 and the hammer 103, so that the gong is sounded each time the ribbon is shifted so as to expose a new station name or sign. After the ribbon has begun to move the fingers 52 and 52' are again projected into the path of the next succeeding stop bar and the force of the spring is resisted by the ribbon which, as will be seen, is frail and should be stopped gradually so as to prevent the stop bar from being pulled from the ribbon. As the button 86 moves upward, while the ribbon has shifted nearly to the desired extent, the button comes in contact with the end 93 of the arm 91 and causes slight compression of air in the cylinder 95 so as to gradually check movement of the ribbon moving gearing that is actuated by the spring 80. The arrangement is such, however, that the chain is positively stopped by the button 86 and arm 91 before fracture of the ribbon can take place after having been gradually stopped at the exact position required for exposure of the station name. When the stop bars 41 are traveling downward the stop fingers 52 and 52' are drawn downward by the stop bars and remain in such adjustment until the ribbon is reversed, when the first stop bar that engages the fingers moves them upward in which position they remain until the ribbon is again started in the reverse direction.

The cushion or dash pot illustrated serves to prevent accidents in case the operator should accidentally release the chain 78 after putting the spring under tension, and it should be understood that any other suitable dash pot or devices for performing the function thereof may be provided, if preferred.

Having thus described the invention what is claimed as new, is—

1. A station indicator or advertiser including two rotatably supported rollers, a ribbon connected to the rollers, a rotatably supported wheel, a supported spring, a supported dash-pot, a piston movable in the dash-pot, a movable device connected to the piston, a cable connected to the spring and extending about the wheel and having a button thereon for engaging the device, and means for connecting the wheel with either one of the rollers for moving the ribbon.

2. A station indicator or advertiser including a casing, two rollers rotatably mounted in the casing and provided each with a bevel gear wheel, a shaft rotatably mounted in the casing to move longitudinally and having two bevel gear wheels fixed thereon movable alternatively to engage the gear wheels of the rollers, a crown wheel rotatably mounted in the casing, a spur wheel rotatable on the shaft and meshing with the crown wheel, a pawl mounted on the spur wheel, a ratchet wheel secured to the shaft and engaged by the pawl, a coil spring connected to the casing, and a cable connected to the spring and also to the crown wheel.

3. A station indicator or advertiser including a casing, two rollers rotatably mounted in the casing, two bevel gear wheels connected to the two rollers respectively, a ribbon connected to the rollers, a shaft rotatably mounted and movable longitudinally in the casing, two bevel gear wheels secured to the shaft in proximity to the two bevel wheels that are connected to the rollers, two ratchet wheels secured to the shaft, a spur wheel rotatably mounted on the shaft, a crown wheel rotatably mounted in the casing in mesh with the spur wheel, means for rotating the crown wheel to and fro, a pawl movably mounted on the spur wheel and engaging one of the two ratchet wheels, a gong supported on the casing in proximity to the shaft, and a pawl pivoted to the casing and engaging the other one of the ratchet wheels and having a hammer thereon that is adjacent the gong.

4. A station indicator or advertiser including a casing, two rollers rotatably mounted in the casing, a bevel gear wheel secured to one of the rollers, a shaft rotatably mounted in the casing, a bevel gear wheel secured to the shaft and meshing with the gear wheel that is secured to the roller, a ratchet wheel secured to the shaft, a spur wheel rotatable on the shaft, a pawl movably connected to the spur wheel and engaging the ratchet wheel, a crown wheel rotatably supported in the casing and meshing with the spur wheel, the crown wheel having a groove in its periphery, a coil spring connected to the casing, a cable connected to the spring and extending in said groove and through the casing, the cable being secured to the crown wheel, a ribbon connected to the two rollers, stop bars secured to the ribbon, an arm pivotally supported in the casing, a button secured to the cable for moving the arm in one direction, a rock shaft mounted in the casing and operatively connected with the arm, a spring supported in the casing for moving the arm in the opposite direction, and fingers movable by the rock shaft to or from the path of movement of the stop bars.

5. In a station indicator or advertiser, the combination with a casing, two rollers rotatably mounted in the casing and provided each with a gear-wheel, a ribbon connected to the rollers, and stop bars secured to the ribbon, of a rock-shaft mounted in the casing, two arms secured to the rock-shaft and having each a finger thereon normally projected into the path of movement of the stop bars, a shaft rotatably mounted and movable longitudinally in the casing, two gear-wheels secured to the shaft in proximity to the gear-wheels of the rollers respectively, a curved rack-bar pivotally supported in the casing, a toothed wheel rotatable on the shaft and meshing with the rack-bar, a pawl mounted on the toothed wheel, a ratchet wheel secured to the shaft and engaged by the pawl, a spring operatively connected with the casing and the rack-bar for moving the ribbon to carry the stop bars to the fingers, a cylinder supported in the casing, a piston movable in the cylinder, and means enabling the cylinder and the piston to coöperate with the rack-bar to resist the action of the spring when the stop bars are approaching the fingers.

6. In a station indicator, the combination with a casing, two rollers rotatably mounted in the casing and provided each with a bevel gear-wheel, a ribbon connected to the rollers, and stop bars secured to the ribbon, of a plurality of guides mounted in the casing at opposite sides of the ribbon and having openings therein, a rock-shaft mounted in the casing, two arms secured to the rock-shaft and having each a finger thereon normally projected through the openings into the path of movement of the stop bars, an operating arm secured to the rock-shaft, a spring operating to turn the rock-shaft for projecting the fingers, a shaft rotatably mounted and movable longitudinally in the casing, two bevel gear-wheels secured to the shaft in proximity to the bevel gear-wheels of the rollers respectively, a curved rack-bar pivotally supported in the casing, a spur wheel rotatable on the shaft and meshing with the rack-bar, a pawl mounted on the spur wheel, a ratchet wheel secured to the shaft and engaged by the pawl, a coil spring operatively connected with the casing and the rack-bar, means connected to the rack-bar for pulling the spring into tension, and finger-retracting means operable by the spring tensioning means.

7. In a station indicator or advertiser, the combination with a casing, two rollers rotatably mounted in the casing, and a ribbon connected to the rollers, of a wheel rotatably mounted in the casing and having a groove in the periphery thereof, a coil spring connected at one end thereof with the casing, a cable connected at one end thereof to the opposite end of the spring and extending over the wheel in the groove thereof, the cable being secured to the wheel and having a button thereon, two brake wheels connected to the two rollers respectively, two elastic brakes mounted in the casing and embracing the two brake wheels respectively, an arm pivoted in the casing and extending nearly to the cable opposite the button, a speed retarder connected to the arm, and gearing connected with the grooved wheel and movable into operative connection with either one of the rollers.

8. In a station indicator or advertiser, the combination with a casing, two rollers rotatably mounted in the casing and having each a gear wheel thereon, a ribbon connected to the rollers, and stop bars secured to the ribbon, of a rock shaft mounted in the casing, two arms secured to the rock shaft and having projections thereon, two fingers pivoted to the arms and having openings therein loosely receiving the projections to limit the movement of the fingers on their pivots, springs mounted on the arms and engaging the pivoted portions of the fingers, an operating arm secured to the rock shaft, a spring operating to turn the rock shaft for projecting said fingers into the path of movement of said stop bars, a main spring mounted in the casing, gearing connected with the main spring and movable into connection with either one of said gear wheels, a chain connected with the spring for putting it under tension, a button secured to the chain, and devices connected with the operating arm and adapted to be engaged by the button for retracting the fingers.

In testimony whereof, I affix my signature in presence of two witnesses.

BURR R. SKINNER.

Witnesses:
CLYDE BOWMAN,
K. N. OHLHOUSE.

---

Copies of this patent may be obtained for five cents each, by addressing the "Commissioner of Patents, Washington, D. C."